Dec. 3, 1929. P. J. BIMAT 1,737,909
GRAB
Filed Aug. 4, 1928
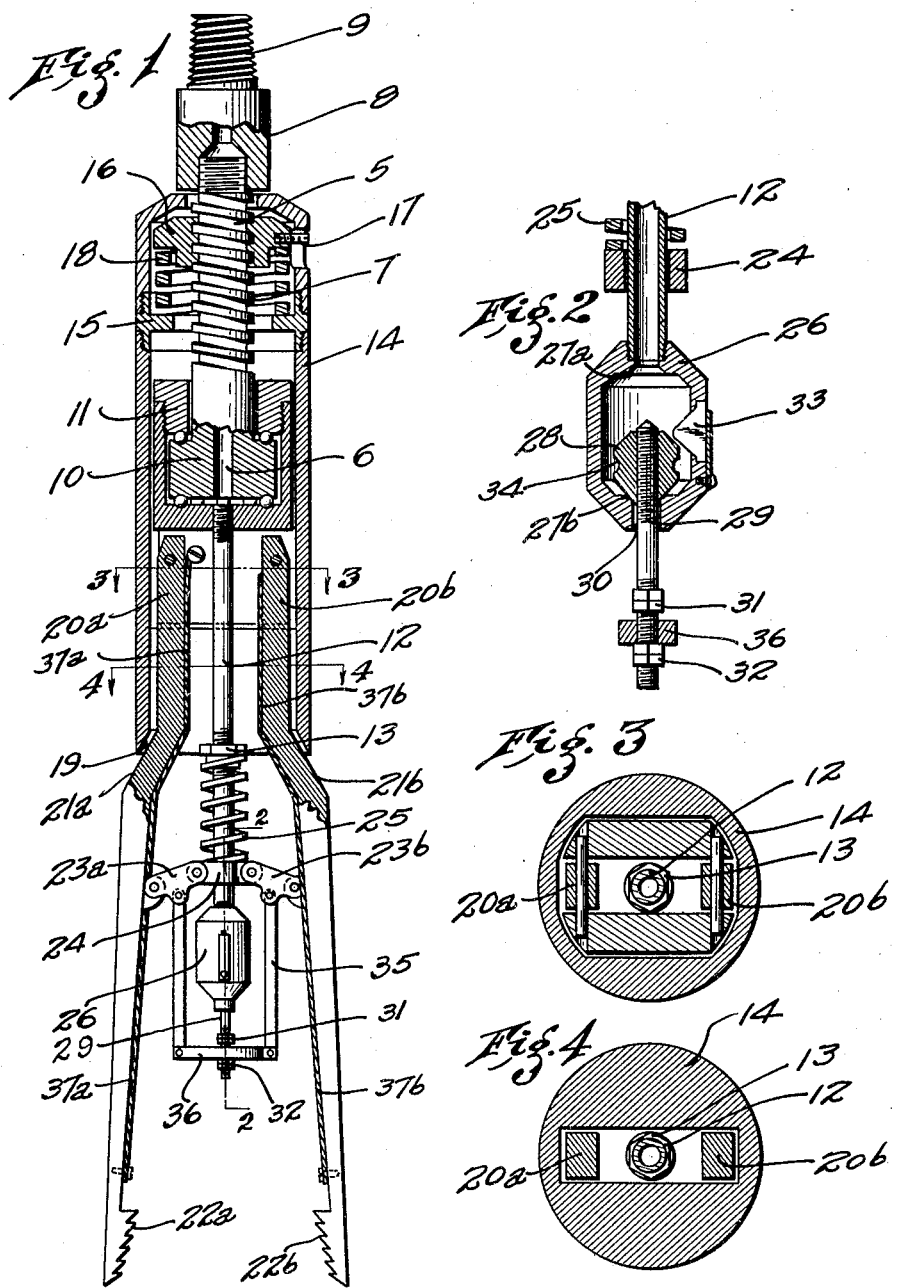
INVENTOR
Pascal J. Bimat
By Westall and Wallace
ATTORNEYS Patented Dec. 3, 1929

1,737,909

UNITED STATES PATENT OFFICE

PASCAL J. BIMAT, OF BAKERSFIELD, CALIFORNIA

GRAB

Application filed August 4, 1928. Serial No. 297,410.

This invention relates to a tool for well holes adapted to obtain a hold on lost parts, tools, pipes and other "junk" commonly called "fish." It appertains more particularly to a tool known as a grab and having jaws to embrace and grip a fish.

The present invention has for its objects any or all of the following features: The provision of a tool having means for moving the jaws to collapsed position and having an intermediate resilient member whereby the collapsion is inaugurated and will be continued by the resilient means, if the fish permits further movement after grabbing; the provision of means to prevent loss of the jaws or protrusion of broken parts; the provision of means to indicate when the jaws are either totally collapsed or fully open, or in intermediate fish gripping position; and the provision of such indicating means operating upon the circulation.

These objects together with other objects and corresponding accomplishments are obtained by means of the embodiment of my invention illustrated in the accompanying drawing, in which:—

Fig. 1 is a central longitudinal section through a tool embodying my invention, parts being shown in elevation; Fig. 2 is a detail view in section as seen on the line 2—2 of Fig. 1 and on an enlarged scale showing the indicating valve means; and Figs. 3 and 4 are sections as seen on the lines correspondingly numbered in Fig. 1.

Referring with more particularity to the drawing, 5 marks a column having a circulation passage 6 extending therethrough and provided with an inclined plane or thread 7 thereon. Secured to the upper end of the column is a coupling joint 8 having a pin 9 adapted to be attached to a rotary drill pipe. An enlargement 10 is provided upon the lower end of the column and forms a journal for attachment thereto of the head 11. Depending from the head and in registration with the passage 6 is a tubular stem 12 having an abutment nut 13 threaded thereon.

Mounted over the head and column is a cage 14 in the form of a bowl provided with a seat 15. The head 11 has flat sides cooperating with corresponding flat walls in the bore of the cage so as to provide for longitudinal and non-rotatable movement of the cage with respect to the head. Mounted upon the column and in engagement with the thread 7 is a female member 16 comprising a nut. The nut is splined to the cage so as to be non-rotatable in relation thereto, such spline connection comprising a key pin 17 riding in a way in the cage. Interposed between the nut and seat is a compression spring 18, which tends to project the cage downwardly with respect to the column. The lower end of the cage has an inner bevelled surface forming a shoe to cooperate with sloping surfaces on the jaws.

The head 11 is slotted at the lower end and mounted in the slot and pivotally secured thereto are jaws $20^a$ and $20^b$. These jaws are provided with sloping surfaces $21^a$ and $21^b$ to coact with the shoe 19. The jaws are preferably provided with teeth $22^a$ and $22^b$ for engaging the fish. Secured to and intermediate the jaws is a toggle comprising outer links $23^a$ and $23^b$ and a central link 24 having an opening or bore to slidably receive the stem 12. Interposed between the nut 13 and the link 24 is a compression spring 25 tending to expand the toggle.

Secured to the lower end of the stem 12 is a blind valve cage 26 having opposing seats $27^a$ and $27^b$ for a valve 28. A valve stem 29 is secured to the valve, it extending through the opening 30 in the cage, the latter having passages for the egress of circulation from the cage. On the valve stem are spaced abutments 31 and 32 shown in the form of nuts. Disposed in the wall of the cage is a spring detent 33 arranged to engage a peripheral recess 34 in the valve, to hold the latter in intermediate position between the valve seats. A bracket 35 of stirrup form has its legs secured to the toggle links $23^a$ and $23^b$. This bracket includes a cross member 36 through which the valve stem 29 slidably extends, the abutments 31 and 32 being disposed on opposite sides.

To provide against loss of the jaws, such as may occur if the pivotal connections to the head are broken or the arms broken, flexible lines 37ª and 37ᵇ are connected to the jaws and to the head. These lines may be cable and welded or attached to the jaw members along their length so that in case of breakage the ends at the breaks will not protrude and catch. Also the broken parts will still be anchored to the body.

The parts of the tool are when expanded in the position shown in Fig. 1. In this position the compression spring 18 is expanded and the toggle is expanded, holding the jaws in expanded position. The valve 28 rests upon seat 27ᵇ closing circulation. The tool is now lowered until the jaws embrace the fish. Thereupon, the drill string is rotated, causing the nut 16 to ride downwardly upon the column 5 and move the cage 14 downwardly through the intermediate action of the compression spring 18. The shoe 19 engaging the sloping surfaces 21ª and 21ᵇ on the jaws collapse the latter upon the fish. At the same time, the toggle is collapsed against the action of compression spring 25. Collapsion of the toggle causes the stirrup 35 to be raised and the cross member 36 to engage the abutment 31 on the valve stem. This causes the valve stem and valve 28 to be raised from the seat 27ᵇ, and finally the peripheral notch 34 is engaged by the nose of the detent 33. The valve will be held in this position, unless forced further upwardly. Assuming that the fish has been grabbed between the lips 22ª and 22ᵇ, the jaws cannot move further toward full collapsion. Spring 18 serves to firmly hold the cage 14 in such position as to maintain a grip upon the fish. The compression spring 18 being in compression, will, if the fish turns or otherwise disposes itself with a less dimension between the jaws, cause the jaws to follow and maintain their hold upon the fish. Thus, the fish is not lost. The nut 16 serves to inaugurate the gripping action and the spring 18 to maintain the gripping action. If the fish should be lost or the jaws totally collapsed, the toggle will cause the valve stem and valve 28 to be lifted so that it will rest upon seat 27ª and close the circulation. At the beginning of the action, while the jaws are open, there is no circulation due to the valve 28 resting upon seat 27ᵇ. As soon as the jaws are collapsed to gripping position, the valve 28 is moved to a position intermediate its seats and circulation starts. If the jaws totally collapse either due to failure to grab the fish or by reason of its loss, the jaws will move toward one another and collapse the toggle, causing the valve 28 to be seated upon the upper seat 27ª closing circulation. Thus, by noting the circulation, it can be determined whether the fish has been grabbed and if the jaws are collapsed without retaining the fish, they may be again expanded without the necessity of pulling the tool.

What I claim is:—

1. A tool of the character described comprising a column having a male inclined plane thereon and means for attachment to a rotatable operating string, a head journalled to said column, gripping jaws secured to said head for movement to and from each other, resilient means tending to hold said jaws expanded, a cage mounted over said head longitudinally movable in relation thereto, said cage having surfaces engaging sloping surfaces formed on said jaws for collapsing the latter, a female member riding on said plane longitudinally movable and non-rotatable with respect to said jaws, and a resilient member interposed between said female member and said cage tending to longitudinally move said cage with relation to said female member so as to collapse said jaws.

2. A tool of the character described comprising a column having a male inclined plane thereon and means for attachment to a rotatable operating string, a head journalled to said column, gripping jaws secured to said head for movement to and from each other, resilient means tending to hold said jaws expanded, a cage mounted over said head longitudinally movable and non-rotatable in relation thereto, said cage having surfaces engaging sloping surfaces formed on said jaws for collapsing the latter, a female member riding on said plane longitudinally and non-rotatable in relation to said cage, and a resilient member interposed between said female member and said cage tending to longitudinally move said cage with relation to said female member so as to collapse said jaws.

3. A tool of the character described comprising a column having a screw thread thereon and means for attachment to a rotatable operating string, a head journalled on said column, gripping jaws secured to said head for movement to and from each other, resilient means tending to hold said jaws expanded, a cage mounted over said head longitudinally movable and non-rotatable in relation thereto, said cage having surfaces engaging sloping surfaces formed on said jaws for collapsing the latter, a nut mounted on the thread of said column longitudinally and non-rotatably mounted in relation to said cage, and a spring interposed between said nut and said cage tending to longitudinally move said cage with relation to said nut so as to collapse said jaws.

4. A tool of the character described comprising a column having a screw thread thereon and means for attachment to a rotatable operating string, a head journalled on said column, gripping jaws secured to said head for movement to and from each other, a topple disposed between said jaws and secured thereto, resilient means tending to expand said toggle connected to said head and toggle, a cage mounted over said head longitudinally movable in relation thereto, said cage having surfaces engaging sloping surfaces formed on said jaws for collapsing the latter, a nut mounted on the thread of said column longitudinally movable and non-rotatable with respect to said jaws, and a resilient member interposed between said nut and said cage tending to longitudinally move said cage with relation to said nut so as to collapse said jaws.

5. A tool of the character described comprising a column having a screw thread thereon and means for attachment to a rotatable operating string, a head journalled on said column, gripping jaws pivotally secured to said head for movement to and from each other, a toggle disposed between said jaws and secured thereto, a stem depending from said head, a spring embracing and abutting said stem and toggle tending to expand said toggle, a cage mounted over said head longitudinally movable and non-rotatable in relation thereto, said cage having surfaces engaging sloping surfaces formed on said jaws for collapsing the latter, a nut mounted on the thread of said column longitudinally and non-rotatably mounted in relation to said cage, a resilient member interposed between said nut and said cage tending to longitudinally move said cage with relation to said nut so as to collapse said jaws.

6. A tool of the character described comprising a column having a screw thread thereon and means for attachment to a rotatable operating string, a head journalled on said column, gripping jaws secured to said head for movement to and from each other, resilient means tending to hold said jaw expanded, a cage mounted over said head longitudinally movable in relation thereto, said cage having surfaces engaging sloping surfaces formed on said jaws for collapsing the latter, a nut mounted on the thread of said column longitudinally movable and non-rotatable with respect to said jaws, a resilient member interposed between said nut and said cage tending to longitudinally move said cage with relation to said nut so as to collapse said jaws, and flexible anchoring lines secured to and extending along said jaws and attached to said head.

7. A tool of the character described comprising a column having a screw thread thereon and means for attachment to a rotatable operating string, a head journalled on said column, gripping jaws secured to said head for movement to and from each other, resilient means tending to hold said jaws expanded, a cage mounted over said head longitudinally movable and non-rotatable in relation thereto, said cage having surfaces engaging sloping surfaces formed on said jaws for collapsing the latter, a nut mounted on the thread of said column longitudinally and non-rotatably mounted in relation to said cage, a resilient member interposed between said nut and said cage tending to longitudinally move said cage with relation to said nut so as to collapse said jaws, and flexible anchoring lines secured to and extending along said jaws and attached to said head.

8. A tool of the character described comprising a column having a screw thread thereon and means for attachment to a rotatable operating string, a head journalled on said column, gripping jaws secured to said head for movement to and from each other, a toggle disposed between said jaws and secured thereto, resilient means tending to expand said toggle connected to said head and toggle, a cage mounted over said head longitudinally movable in relation thereto, said cage having surfaces engaging sloping surfaces formed on said jaws for collapsing the latter, a nut mounted on the thread of said column longitudinally movable and non-rotatable with respect to said jaws, a resilient member interposed between said nut and said cage tending to longitudinally move said cage with relation to said nut so as to collapse said jaws, and flexible anchoring lines secured to and extending along said jaws and attached to said head.

9. A tool of the character described comprising a column having a screw thread thereon and means for attachment to a rotatable operating string, a head journalled to said column, gripping jaws pivotally secured to said head for movement to and from each other, a toggle disposed between said jaws and secured thereto, a stem depending from said head, a spring embracing and abutting said stem and seated on said toggle, tending to expand said toggle connected to said head and toggle, a cage mounted over said head longitudinally movable and non-rotatable in relation thereto, said cage having surfaces engaging sloping surfaces formed on said jaws for collapsing the latter, a nut mounted on the thread of said column longitudinally and non-rotatably mounted in relation to said cage, a resilient member interposed between said nut and said cage, tending to longitudinally move said cage with relation to said nut so as to collapse said jaws, and flexible anchoring lines secured to and extending along said jaws and attached to said head.

10. A tool of the character described comprising a hollow column for circulation having a screw thread thereon and means for attachment to a rotatable drill pipe, a head journalled on said column, gripping jaws secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between, there being space in said cage for circulation around said valve, a detent to hold said valve in position intermediate said seat, a valve stem secured to said valve, a toggle disposed between said jaws and connected thereto, resilient means tending to expand said toggle, a bracket attached to said valve stem and to said toggle whereby upon expansion of said toggle to move said valve toward one seat and upon collapsion to move said valve toward the other seat, a cage mounted over said head longitudinally movable in relation thereto, a nut mounted on the thread of said column longitudinally movable and non-rotatable with respect to said jaws, said cage having surfaces engaging sloping surfaces formed on said jaws for collapsing the latter, and a resilient member interposed between said nut and said cage tending to longitudinally move said cage with relation to said nut so as to collapse said jaws.

11. A tool of the character described comprising a hollow column for circulation having a screw thread thereon and means for attachment to a rotatable drill pipe, a head journalled on said column, gripping jaws secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between, there being space in said cage for circulation around said valve, a detent to hold said valve in position intermediate said seats, a valve stem secured to said valve, a toggle disposed between said jaws and connected thereto, resilient means tending to expand said toggle, a bracket attached to said valve stem and to said toggle whereby upon expansion of said toggle to move said valve toward one seat and upon collapsion to move said valve toward the other seat, a cage mounted over said head longitudinally movable in relation thereto, a nut mounted on the thread of said column longitudinally movable and non-rotatable with respect to said jaws, said cage having surfaces engaging sloping surfaces formed on said jaws for collapsing the latter, a resilient member interposed between said nut and said cage tending to longitudinally move said cage with relation to said nut so as to collapse said jaws, and flexible anchoring lines secured to and extending along said jaw and attached to said head.

12. A tool of the character described comprising a hollow column for circulation having a screw thread thereon and means for attachment to a rotatable drill pipe, a head journalled on said column, gripping jaws secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between them, there being space in said cage for circulation around said valve, a detent to hold said valve in position intermediate said seats, a valve stem secured to said cage, a toggle disposed between said jaws and connected thereto, resilient means tending to expand said toggle, a bracket attached to said valve stem and to said toggle whereby upon expansion of said toggle to move said valve toward one seat and upon collapsion to move said valve toward the other seat, a cage mounted over said head longitudinally movable and non-rotatable in relation thereto, said cage having surfaces engaging sloping surfaces formed on said jaws for collapsing the latter, a nut mounted on the thread of said column longitudinally and non-rotatably mounted in relation to said cage, and a resilient member interposed between said nut, and said cage tending to longitudinally move said cage with relation to said nut so as to collapse said jaws.

13. A tool of the character described comprising a hollow column for circulation having a screw thread thereon and means for attachment to a rotatable drill pipe, a head journalled on said column, gripping jaws pivotally secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between them, there being space in said cage for circulation around said valve, a detent to hold said valve in position intermediate said seats, a valve stem secured to said cage, a toggle disposed between said jaws and connected thereto, a spring embracing and abutting said stem and seated on said toggle tending to expand said toggle, a bracket attached to said valve stem and to said toggle whereby upon expansion of said toggle to move said valve toward one seat and upon collapsion to move said valve toward the other seat, a cage mounted over said head longitudinally movable and non-rotatable in relation thereto, said cage having surfaces engaging sloping surfaces formed on said jaws for collapsing the latter, a nut mounted on the threads of said column longitudinally and non-rotatably mounted in relation to said cage, a resilient member interposed between said nut and said cage tending to longitudinally move said cage with relation to said nut so as to collapse said jaws, and flexible anchoring lines securing said jaws to said head.

14. A tool of the character described comprising a hollow column for circulation having a screw thread thereon and means for attachment to a rotatable drill pipe, a head journalled on said column, gripping jaws secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between them, there being space in said cage for circulation around said valve, a detent to hold said valve in position intermediate said seats, a valve stem secured to said cage, a toggle disposed between said jaws and connected thereto, resilient means tending to expand said toggle, a bracket attached to said toggle, a lost motion connection between said valve stem and said bracket whereby upon expansion of said toggle to move said valve toward one seat and upon collapsion to move said valve toward the other seat, a cage mounted over said head longitudinally movable in relation thereto, said cage having surfaces engaging sloping surfaces formed on said jaws for collapsing the latter, a nut mounted on the threads of said column longitudinally movable and non-rotatable with respect to said jaws, and a resilient member interposed between said nut and said cage tending to longitudinally move said cage in relation to said nut so as to collapse the jaws.

15. A tool of the character described comprising a hollow column for circulation having a screw thread thereon and means for attachment to a rotatable drill pipe, a head journalled on said column, gripping jaws secured to said head for movement to and from each other, a hollow stem secured to said column and forming a continuation of the circulation passage of said head, a valve cage secured to said stem and having opposed seats, a valve in said cage arranged to be reciprocated therein and rest on either seat or between them, there being space in said cage for circulation around said valve, a detent to hold said valve in position intermediate said seats, a valve stem secured to said cage, a toggle disposed between said jaws and connected thereto, resilient means tending to expand said toggle, a bracket attached to said toggle, a lost motion connection between said valve stem and said bracket whereby upon expansion of said toggle to move said valve toward one seat and upon collapsion to move said valve toward the other seat, a cage mounted over said head longitudinally movable in relation thereto, said cage having surfaces engaging sloping surfaces formed on said jaws for collapsing the latter, a nut mounted on the threads of said column longitudinally movable and non-rotatable with respect to said jaws, a resilient member interposed between said nut and said cage tending to longitudinally move said cage in relation to said nut so as to collapse the jaws, and flexible anchoring lines secured to and extending along said jaws and attached to said head.

In witness that I claim the foregoing I have hereunto subscribed my name this 25th day of July, 1928.

PASCAL J. BIMAT.